Sept. 8, 1970   B. H. THOMPSON   3,527,575
DISTRIBUTORS OF FLUIDIZING MEDIA FOR FLUIDIZED BEDS
Filed March 24, 1967   2 Sheets-Sheet 1
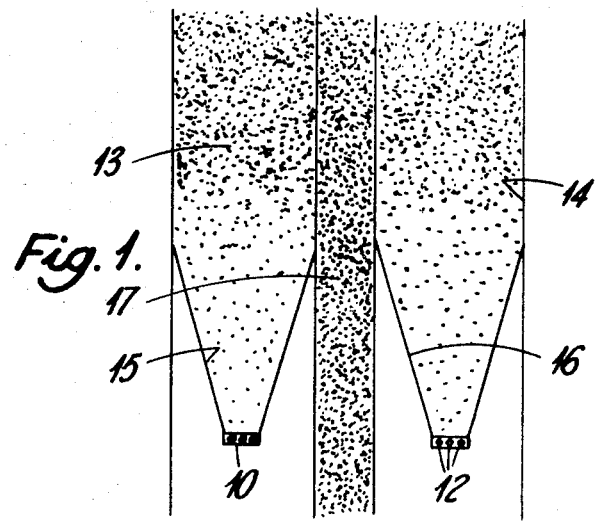
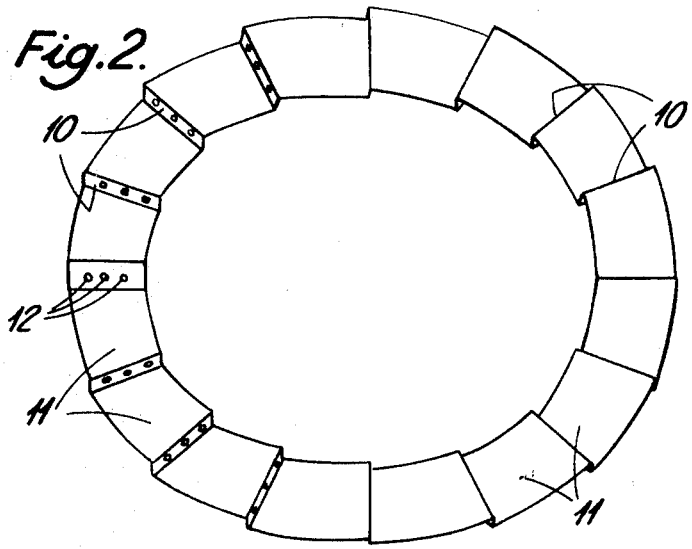

Sept. 8, 1970  B. H. THOMPSON  3,527,575
DISTRIBUTORS OF FLUIDIZING MEDIA FOR FLUIDIZED BEDS
Filed March 24, 1967  2 Sheets-Sheet 2
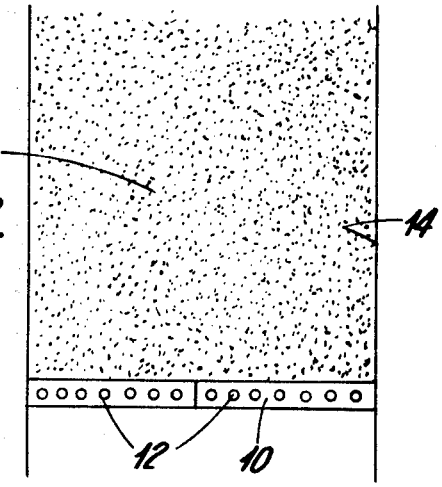
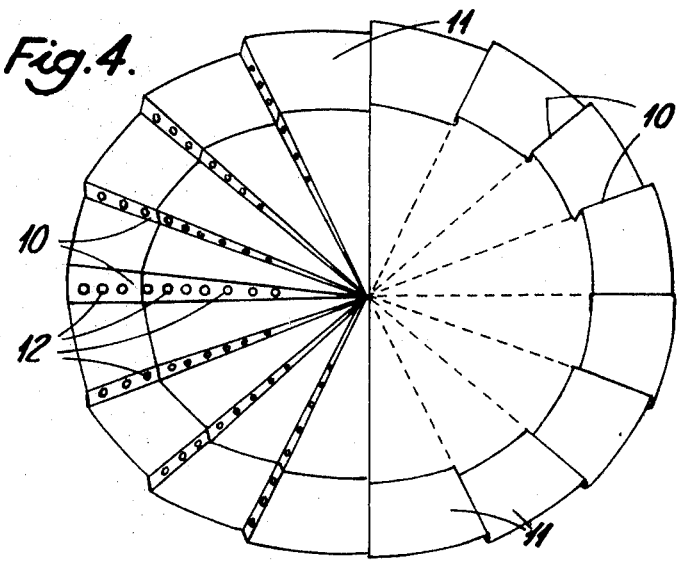

3,527,575
**DISTRIBUTORS OF FLUIDIZING MEDIA
FOR FLUIDIZED BEDS**
Brian Hoyle Thompson, Solihull, England, assignor to
The Gas Council, London, England, a British body
corporate
Filed Mar. 24, 1967, Ser. No. 625,875
Claims priority, application Great Britain, May 31, 1966,
14,290/66
Int. Cl. B01j 9/18
U.S. Cl. 23—284           7 Claims

ABSTRACT OF THE DISCLOSURE

Apparatus for use in producing a fluidized bed of solid particles, which apparatus comprises a chamber for the particles to be fluidized, said chamber having a floor of multi-stepped formation with apertures for the passage of the fluidizing medium in the step risers.

Preferably, the steps radiate from a common centre or are arranged around an annulus.

In use, the particles are swept off the treads and a swirling motion imparted to them. The apertures do not become blocked when the bed slumps.

---

This invention relates to distributors through which a fluidizing medium is supplied to a fluidized bed (which term is to be understood as including a bed of particles for fluidization), and apparatus for producing a fluidized bed.

A considerable number of devices have been designed and used for admitting fluidizing medium to the base of a fluidized bed. They represent attempts to overcome the disadvantages of the simplest devices, which include an inverted conical section, or a flat perforated plate, which may be called a sieve plate. Alternatively, a porous plate made by sintering a coarse metallic or other powder may be used. Plates may be used in conjunction with conical entries.

These devices all suffer in varying degrees from certain disadvantages.

Sieve plates which occupy a substantial proportion of the cross-sectional area of the bed must have a large number of holes which, unless they are very small, lead to the plate having too little pressure differential across it. Gas distribution then tends to be uneven; static zones, in which there is little or no fluidization, may be set up in the bed of solid particles just above the plate so that gas flow is impeded and distribution deteriorates further. Very small holes, on the other hand, easily become blocked and may suffer enlarging erosion at their edges. Sieve plates are particularly exposed to the danger of blockage due to particles falling into the holes when gas flow through them is insufficient, or when the bed is in violent bumping movement with very uneven fluidization.

Sieve plates are inconvenient to use when it is desired to stop fluidization, allowing the bed to slump on the plate, that is, to become static. There is then every opportunity for blockage and for particles to fall through the holes. It may then be difficult to restart fluidization satisfactorily and it is generally particularly inconvenient and troublesome to have solid fluidized particles in the region below the sieve plate.

Porous sintered plates are less troublesome in some of these respects but they have the disadvantage that they are readily blocked by any small particles which may be fortuitously present in the fluidizing medium, which would readily pass through the holes of a sieve plate.

Conical entries, without sieve plates, have the disadvantage that large bubbles enter the bed and there is poor mixing of the fluidizing medium with the solid particles. They are very exposed to backward flow of solids against the gas stream and they tend to fill and block when fluidization ceases. They can also give rise to "spouting," the passage of a jet of fluidized medium through the bed which leads to bad contact between the fluid and the solids. Sieve plates incorporated into cones suffer from the disadvantages already described.

Certain known designs of distributor incorporate arrangements of annular plates, separated by circular gaps for the passage of gas, such plates being perhaps in different planes. Devices of the bubble-cap type have been used for the specific purpose of preventing backflow of solids.

The present invention provides apparatus for use in producing a fluidized bed of solid particles, which apparatus comprises a chamber for the particles to be fluidized, said chamber being characterized by having a floor of multi-stepped formation with apertures for the passage of the fluidizing medium in the step risers. The floor, part thereof, which is of multi-stepped formation is the distributer.

In use, the fluidizing medium passes through the apertures in the step risers and across the treads so as to sweep solid particles from the treads up into the region of fluidization.

It is preferred that the steps radiate from a common centre, in which case the distributor may conveniently be circular, or in the form of an annulus. The generally circular or annular shape of the distributor and the lateral injection of the fluidizing medium imparts a swirling motion to the base of the fluidized bed. The risers containing the holes for the passage of the fluidizing medium preferably face circumferentially in the same direction around the common centre. The steps may have a sawtooth formation and lie substantially in a common horizontal plane.

The risers of the steps are at least steeply sloping, and are preferably vertical or even undercut to minimize the tendency of particles from the fluidized bed to pass through the holes in the risers when the bed is allowed to slump on to the distributor. Holes may be provided, for the passage of the fluidizing medium, in the treads, which may be horizontal or gently sloping, but it is preferred that the majority of the apertures for the passage of the fluidizing medium are in the step risers.

If desired, any tendency for solid particles to fall into a dip inconveniently near the holes in a riser may be reduced by constructing each tread so that it projects a little beyond (i.e. overhangs) the riser below it. Advantageously, for the same purpose, the walls of the risers through which the holes for fluidizing medium pass may be so thick that the holes are in the form of tunnels, longer than their diameter, say, three or four times as long.

The distributor is preferably of generally circular shape, for use with a cylindrical reaction vessel but it can be of other forms, for instance, elliptical. Other arrangements of a stepwise distributor are possible, but are less advantageous. For instance, straight strips of distributor can be laid side by side on the floor of a vessel which may be rectangular in cross-section or of any convenient shape. If they were laid all pointing in the same direction there would be uneven distribution of fluidizing medium as between the regions generally in front of and generally behind the holes, with the region at the back of the holes receiving insufficient fluidizing medium. This might be overcome by laying strips in alternate directions; but there would be a tendency for the discharges from neighbouring sets of holes, facing one another diagonally, to interfere with one another. Short vertical barriers between strips would minimize this tendency.

Two embodiments of the invention are illustrated in the accompanying drawings, in which FIGS. 1 and 3 are sectional side elevations through the axes of cylindrical vessels containing fluidized beds, and FIGS. 2 and 4 are perspective views of the distributor used in the vessels of FIGS. 1 and 3 respectively.

FIG. 2 illustrates an annular distributor having sixteen steps round the ring, which is circular in plan. The steps consist of vertical risers 10, facing counterclockwise round the ring, and gently inclined treads 11. Each riser contains three holes 12 extending through the distributor for the passage of the fluidizing medium.

In FIG. 1, two diametrically opposed risers 10 are visible together with the holes 12 through them. A bed of particles 13 is maintained in a fluidized state, by the supply of a fluidizing medium through the holes 12, and is contained within a vertical cylinder 14 and sloping walls 15 and 16 which converge towards the distributor which is carried at their lower extremity. A central tube 17 is provided as a duct for the movements of fluidized solids into or out of the bed.

The tube 17 is an optional feature. When it is used, it need not be co-axial with the vessel containing the fluidized bed and if a number of such distributors are employed, one above another, as in countercurrent systems for contacting fluidized solids with gas, the ducts are staggered with respect to one another. Alternatively, if it is desired to retain the feature that the tube 17 passes cenrally through the annular device, the lower part of the tube below its junction with the device can be inclined away from the centre so as to deliver solids passing downwards onto one side of the bed below it.

In FIG. 4, the distributor is circular, rather than annular, and the sixteen steps radiate from the centre. Each vertical riser 10 contains a number of holes 12, for example, twelve, although, for convenience, only seven are shown in the two risers 10 visible in FIG. 3. The sloping walls 15 and 16, and the tube 17 are absent from the embodiment illustrated in FIG. 3.

The generally conical arrangement of FIG. 1 is preferred to the generally flat arrangement of FIG. 3 when it is desired to use the tube 17, since the higher velocities in the conical part, for a given velocity in the bed above, help to avoid stagnation near the tube 17.

It will be readily apparent how the distributors illustrated overcome the difficulties of the prior art. The holes are in a vertical or nearly vertical face, which may be undercut, so that the tendency for particles to enter them is much reduced. The discharge of fluidizing medium across the treads sweeps them free of solids and also hinders particles from falling into the dip formed by the next succeeding riser and tread. When the bed is slumped, there is no resistance to the resumption of fluidization.

The apparatus and method of operation can be used with any suitable fluidized bed system. Its use will be particularly advantageous as a precaution against agglomeration of the bed, since it is directed particularly at avoiding the establishment of static zones. Examples of processes in which the danger exists and can be overcome by the method of the invention are, the hydrogenation of powdered coal under pressure, and the hydrogenation of crude petroleum under pressure in the presence of a fluidized bed of coke.

An apparatus was constructed generally as in FIG. 1, the distributor being of metal and the remainder of Perspex.

Overall diameter of vessel 14—11¼"
Depth of cone pieces 15, 16—11"
Diameter of tube 17—3⅜"
Treads and risers:
    Number—16 of each
    Width—1"
Depth of risers—⅜"
Holes:
    Number per riser—3
    Centres spaced apart—¼"
    Diameter—0.1"

The centre circle of the risers and treads was 3½" from the axis of the units.

The apparatus was used for the fluidization of Coalite in a bed of static depth 16 ft. overall, expanding to 21 ft. on fluidization. The Coalite was graded (percent by weight):

| | |
|---|---|
| On 36 B.S. sieve | 1.85 |
| Through— | |
| 36 B.S. sieve and on 72 B.S. sieve | 22.65 |
| 72 B.S. sieve and on 100 B.S. sieve | 22.3 |
| 100 B.S. sieve and on 150 B.S. sieve | 14.5 |
| 150 B.S. sieve and on 200 B.S. sieve | 11.95 |
| 200 B.S. sieve and on 300 B.S. sieve | 11.95 |
| 300 B.S. sieve | 14.8 |
| | 100.0 |

It was fluidized with air at atmospheric pressure at supply rates from 210 to 625 s.c.f.h. The bed was uniformly fluidized and there were no static zones. Fluidization was of good quality with a minimum of bubbles.

I claim:
1. Apparatus for use in producing a fluidized bed of solid particles, which apparatus comprises a chamber for the particles to be fluidized, said chamber being characterized by having a floor of multi-stepped formation in cross-section thereby forming a plurality of risers, each of said risers having apertures therein treads connecting adjacent risers, said treads being gradually upwardly inclined from the base of each of said risers to the top of an adjacent riser, and the steps formed by said risers and treads lying substantially in a common horizontal plane, whereby said apertures provide passage for a fluidizing medium therethrough and across said treads so as to sweep solid particles off said treads.

2. Apparatus as claimed in claim 1 wherein the longitudinal axis of each of said risers extend along a radial line from a common centre.

3. Apparatus as claimed in claim 2 wherein said risers face circumferentially in the same direction around the common centre.

4. Apparatus as claimed in claim 1 wherein the steps are arranged so as to form an annular ring.

5. Apparatus as claimed in claim 1 wherein said risers are substantially vertical.

6. Apparatus as claimed in claim 1 wherein the apertures in the step risers are tunnels having lengths of from three to four times greater than their diameters.

7. Apparatus as claimed in claim 1 which further comprises means for supplying the fluidizing medium through the apertures and into said chamber.

References Cited
UNITED STATES PATENTS

| | | | |
|---|---|---|---|
| 2,513,370 | 7/1950 | Shaw | 34—57 |
| 2,906,608 | 9/1959 | Jequier et al. | 23—284 |

JAMES H. TAYMAN, Jr., Primary Examiner

U.S. Cl. X.R.

23—1, 288; 34—10, 57; 263—21